(12) United States Patent
Roussel et al.

(10) Patent No.: US 10,226,994 B2
(45) Date of Patent: Mar. 12, 2019

(54) MOTOR VEHICLE FRONT SURFACE AIR GUIDE COMPRISING MECHANICAL WEAKNESS AREAS

(71) Applicants: Thierry Roussel, Montesson (FR); Arnold Fayt, Jujurieux (FR)

(72) Inventors: Thierry Roussel, Montesson (FR); Arnold Fayt, Jujurieux (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 15/329,621

(22) PCT Filed: Jul. 23, 2015

(86) PCT No.: PCT/FR2015/052020
§ 371 (c)(1),
(2) Date: Jan. 27, 2017

(87) PCT Pub. No.: WO2016/016549
PCT Pub. Date: Feb. 4, 2016

(65) Prior Publication Data
US 2017/0246949 A1 Aug. 31, 2017

(30) Foreign Application Priority Data
Aug. 1, 2014 (FR) .................................. 14 57540

(51) Int. Cl.
*B60K 11/08* (2006.01)

(52) U.S. Cl.
CPC ........... *B60K 11/08* (2013.01); *B60Y 2306/01* (2013.01)

(58) Field of Classification Search
CPC .................................................... B60K 11/08
See application file for complete search history.

(56) References Cited

U.S. PATENT DOCUMENTS 9,027,683 B2 * 5/2015 Barnes ................... B60K 13/02
180/68.3
2006/0048986 A1 * 3/2006 Bracciano ............... B60H 1/28
180/69.2

(Continued)

FOREIGN PATENT DOCUMENTS

CN 101941376 A 1/2011
CN 102627124 A 8/2012

(Continued)

OTHER PUBLICATIONS

International Search Report PCT/ISA/210 for International Application No. PCT/FR2015/052020 dated Sep. 28, 2015.

(Continued)

*Primary Examiner* — Katy M Ebner
(74) *Attorney, Agent, or Firm* — Harness, Dickey & Pierce, P.L.C.

(57) ABSTRACT

An air guide for the front surface of a motor vehicle including a channel for sealably channelling the air entering through the front of the vehicle to a cooling system when the air guide is mounted onto the vehicle, wherein the channel includes mechanical weakness areas defining programmed permanent shape-changing areas capable, along the longitudinal axis of the vehicle, of shortening the air guide when said mechanical weakness areas change shape.

9 Claims, 5 Drawing Sheets

(56) References Cited

U.S. PATENT DOCUMENTS

| | | | |
|---|---|---|---|
| 2007/0107677 A1* | 5/2007 | Ito | B62D 25/084 123/41.49 |
| 2011/0000728 A1 | 1/2011 | Mildner | |
| 2011/0062750 A1* | 3/2011 | Nakaura | B60K 11/08 296/187.09 |
| 2011/0109123 A1* | 5/2011 | Gonin | B60K 11/08 296/187.09 |
| 2011/0132677 A1* | 6/2011 | Kawahira | F01P 11/10 180/68.1 |
| 2012/0193156 A1* | 8/2012 | Hirano | B60K 11/08 180/68.1 |
| 2013/0316634 A1 | 11/2013 | Ajisaka | |
| 2015/0321547 A1* | 11/2015 | Pickl | F01P 11/08 180/68.1 |
| 2016/0052559 A1* | 2/2016 | Schmidt | B60K 11/08 296/193.1 |
| 2016/0131020 A1* | 5/2016 | Bui | B60K 11/08 180/68.1 |
| 2016/0297294 A1* | 10/2016 | Bruemmer | B60K 11/04 |
| 2016/0311312 A1* | 10/2016 | Park | B60K 11/08 |
| 2017/0043659 A1* | 2/2017 | Vacca | B60K 11/08 |
| 2017/0096059 A1* | 4/2017 | Bui | B60K 11/08 |

FOREIGN PATENT DOCUMENTS

| | | |
|---|---|---|
| CN | 103347726 A | 10/2013 |
| DE | 102008039806 A1 | 2/2010 |
| DE | 102009027475 A1 | 9/2010 |
| EP | 1243455 A2 | 9/2002 |
| FR | 2911559 A1 | 7/2008 |
| JP | S53127035 U | 10/1978 |

OTHER PUBLICATIONS

Written Opinion of the International Searching Authority PCT/ISA/237 for International Application No. PCT/FR2015/052020 dated Sep. 28, 2015.
French Search Report for French Patent Application No. FR 1457540 dated Mar. 17, 2015.
French Written Opinion for French Patent Application No. FR 1457540.
Chinese Office Action dated Aug. 2, 2018 issued in corresponding Chinese Application No. 201580044521X.

\* cited by examiner

MOTOR VEHICLE FRONT SURFACE AIR GUIDE COMPRISING MECHANICAL WEAKNESS AREAS

BACKGROUND

1. Field

This invention relates to the automotive field and especially the field of motor vehicle front surfaces, in particular of the type having air inlets for cooling the vehicle engine.

2. Description of the Related Art

A motor vehicle front surface refers to a set of components located in front of the air coolers, comprising at least the bumper.

A front surface may further comprise: shock elements (absorbers), a beam, fairing elements, air guide elements, front wings, light units, etc.

Generally, a motor vehicle front surface has cooling air inlets which are provided at the front of motor vehicles to cool the engine. The cooling air inlet is often decorated with a grid.

In general, cooling is carried out by means of an air/coolant exchanger, also called a radiator, and/or an intercooler.

These two devices must be supplied by an air flow from the outside of the vehicle to allow them to perform their cooling function.

The radiator is generally supplied by means of a central cooling air inlet, while the intercooler is generally supplied by means of a side cooling air inlet, on the front of the bumper.

These air inlets allow air from outside the vehicle to enter an air duct leading the air towards the cooling systems.

During an impact at the front of the vehicle, the force exerted on the front surface is transmitted to the cooling system by the air duct, due to its rigidity, thereby severely damaging this system.

To overcome this problem, front surfaces having no air guide are known. However, absence of an air guide does not provide an optimum air flow of fresh air, making the cooling system less efficient.

To overcome this problem, an air guide composed of two different organic materials is also known. These bi-material air guides generally consist of at least two polypropylene (PP) parts, one of the parts using a more flexible polypropylene. However, these bi-material air guides do not limit the transmission of force by the air guide sufficiently, and therefore fail to effectively preserve the cooling system in case of vehicle impact.

Lastly, an air guide including a high proportion of flexible materials, for example of elastomer type, is also known. The flexibility of the materials absorbs some of the impact, limiting accordingly the pressures exerted on the cooling system. However, the air guides made of flexible materials are difficult to interface between the cooling system (controlled flaps, etc.) and the bumper due to their behaviour (shape change due to the flexibility). Furthermore, these air guides made of flexible materials are relatively expensive.

SUMMARY

The invention aims to overcome these disadvantages by providing a motor vehicle front surface air guide which limits the transmission to the cooling system of the force exerted on the front surface during an impact at the front of the vehicle. To achieve this, the air guide according to the invention comprises mechanical weakness areas capable of shortening it along the X-axis (longitudinal axis of the vehicle) during a front impact.

Thus, the invention relates to a motor vehicle front surface air guide which comprises a channel for sealably channelling the air entering through the front of the vehicle to a cooling system when the air guide is mounted onto the vehicle. The channel comprises mechanical weakness areas defining programmed permanent shape-changing areas capable of shortening it along the longitudinal axis (X-axis) of the vehicle, when said mechanical weakness areas change shape.

These mechanical weakness areas thereby prevent damage to the cooling system in case of vehicle impact. During a longitudinal impact of the vehicle causing the front surface bumper to move backwards, the bumper exerts a thrust on the air guide(s) interfaced between the bumper and the cooling system, and since the mechanical weakness areas are calibrated to break under a certain level of force, they change shape then break in order to limit the forces transmitted to the cooling system.

The air guide according to the invention also limits the use of flexible material to the bumper interface only, to form a sealing area, thereby reducing the cost of the part.

The mechanical weakness areas may comprise changes of thickness or of material. For example, walls forming the channel may have a given general thickness, and the mechanical weakness areas may in this case have areas thinner than the general thickness, said thinner areas forming permanent shape-changing lines.

Preferably, the mechanical weakness areas form a continuous line in a substantially front section of the channel, so as to optimise the shortening of the channel.

To optimise the shortening of the channel, the number N of shape-changing lines in each channel wall, substantially parallel to the front plane (PF), can also be defined according to the length of the air guide.

According to one embodiment, the channel consists of a set of walls forming a quadrilateral in the front section.

According to one embodiment, each wall forming the channel consists of at least two stepped planes, the surfaces forming intersection between two stepped planes forming said mechanical weakness area.

According to this embodiment, the intersections between two planes can be formed by a film of minimum thickness to provide a seal. The minimum thickness is traditionally less than 0.2 mm and the general thickness of the walls can be about 2 mm.

Preferably, the minimum thickness is located in an area of the air guide likely to receive the most force in case of impact, such as the corners of the air guide.

Lastly, according to the invention, the air guide advantageously comprises a skirt made of flexible material adapted to form a seal between the air guide and the bumper when the air guide is mounted onto the vehicle.

The invention also relates to a motor vehicle front surface comprising at least one air guide according to the invention.

The invention also relates to a motor vehicle comprising a front surface according to the invention.

BRIEF DESCRIPTION OF THE DRAWINGS

The invention will be better understood on reading the accompanying figures, which are given solely by way of example and not limiting in any way, in which:

FIG. 4b illustrates in detail the shape change induced by an impact at the location of the detail of FIG. 4a.

DETAILED DESCRIPTION

Figure 1:
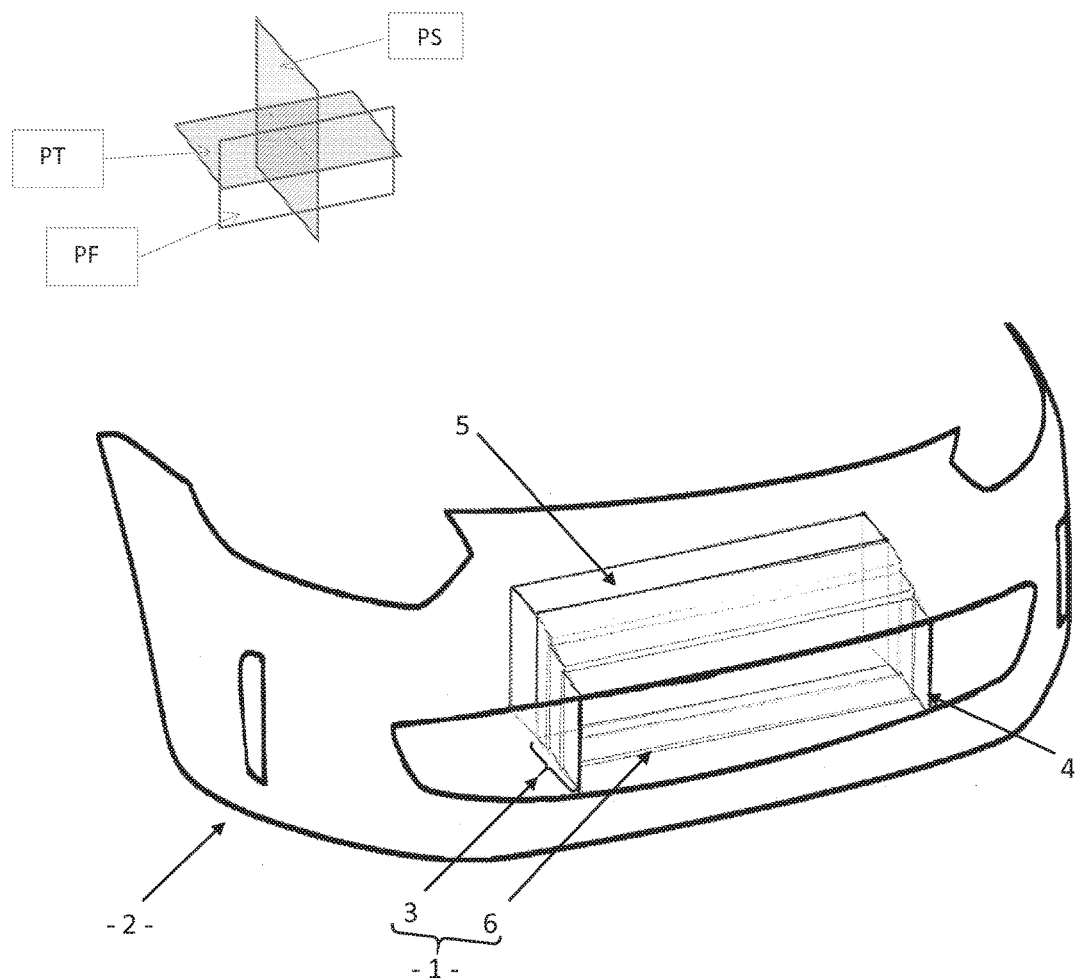
FIG. 1 illustrates an example of an air guide according to the invention mounted onto a vehicle front surface.

According to an example embodiment, illustrated on FIG. 1, the air guide (1) for motor vehicle front surface (2) comprises a channel (3) for sealably channelling the air entering through the front of the vehicle (4) to a cooling system (5) when the air guide (1) is mounted onto the vehicle.

The channel (3) comprises a sagittal plane (PS), or "Y plane", parallel to the vehicle median plane separating the left half from the right half of the vehicle, and a transverse plane (PT), or "Z plane" (horizontal plane), parallel to a plane separating an upper part and a lower part of the vehicle, and a front plane (PF), or "X plane", parallel to a plane separating a front part and a rear part of the vehicle. The transverse plane (PT) is perpendicular to the sagittal plane (PS). The front plane (PF) is perpendicular to the transverse (PT) and sagittal (PS) planes.

According to the invention, the channel (3) comprises mechanical weakness areas (6), defining permanent shape-changing areas capable, along the longitudinal axis (X-axis) of the vehicle, of shortening the air guide (1) when these mechanical weakness areas change shape in case of impact (CH) on the air guide in particular. The longitudinal axis of the channel (3) is an axis lying in the sagittal plane (PS) of the channel (3).

Thus, if the bumper moves backwards:
during small impacts at low speed, impacts typically occurring at speeds less than 10 km/h, such as a parking impact, the bumper, the air guide and the cooling system absorb the forces received without suffering any damage.
during insurance-type impacts, at higher speed, typically greater than 10 km/h and in particular 15 km/h, the fusibility of the air guide is used: the mechanical weakness areas (6) of the air guide are first compressed, then the air guide (1) breaks in these mechanical weakness areas (6), without damaging the cooling system (5).

The channel (3) may consist of one or more walls, flat or not, forming together a "relatively airtight" duct on its sides (lateral/top/bottom), and open at its 2 ends (front/rear). The channel may consist of several smaller channels adjacent (or not), for example optional during assembly on vehicle, for example for a vehicle comprising an optional intercooler. It may also consist, as illustrated on FIG. 1, of a set of walls (four walls on FIG. 1) forming a quadrilateral in the front section (section in the front plane (PF)).

Various solutions are available to produce mechanical weakness areas (6).

For example, changes of material may be made, i.e. materials of lower mechanical strength may be used.

Figure 2A:
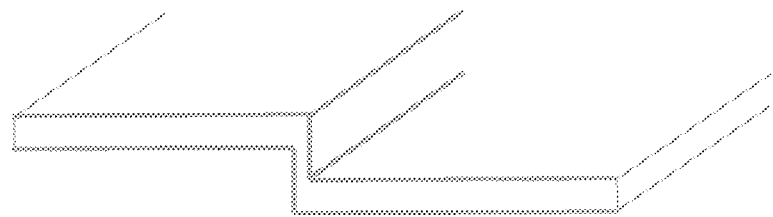
FIGS. 2a to 2d illustrate different solutions to produce the mechanical weakness areas.
Figure 2B:
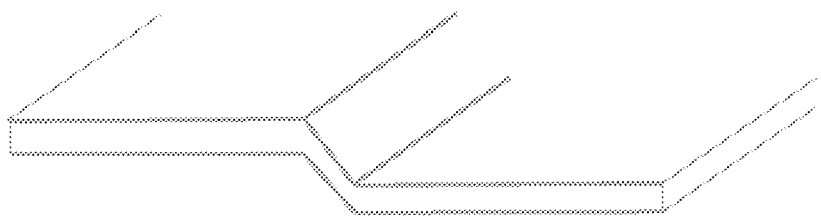
Figure 2C:
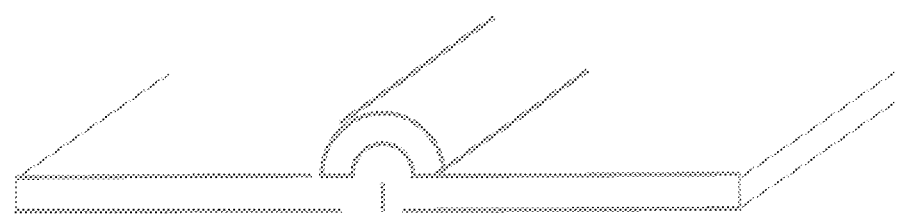
Figure 2D:
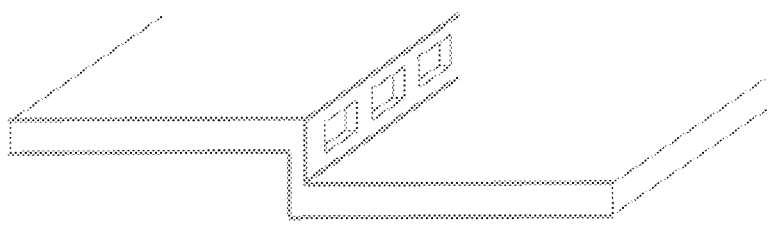

Changes of thickness may also be made, i.e. areas of local thinning made in the wall(s) forming the channel (3). Thus, the walls forming the channel (3) have a given general thickness, and the mechanical weakness areas (6) have areas thinner than the general thickness, said thinner areas forming permanent shape-changing (by folding or breaking) lines. These thinner areas may be open windows (FIG. 2d) if the loss of sealing is not significant compared with the total air flow.

It is also possible to integrate specific shapes favouring shape-change at chosen positions, when the air guide is subjected to the impact stresses: level variation (FIG. 2a), slopes (FIG. 2b), "bulldozer" junction (FIG. 2c), etc.

These various solutions are illustrated on FIGS. 2a to 2d. These solutions may also be combined.

Advantageously, so that these mechanical weakness areas (6) define permanent shape-changing areas capable of shortening the air guide (1) longitudinally, these areas (6) form a continuous line in substantially front cross-section of the air guide (1).

The number N of shape-changing lines in each wall, substantially parallel to the front plane (PF), is defined according to the length of the air guide (1). A sufficient number of shape-changing lines is in fact required so that, during an impact, the air guide shortens enough to protect the cooling system. This design step is known to those skilled in the art.

Figure 3:
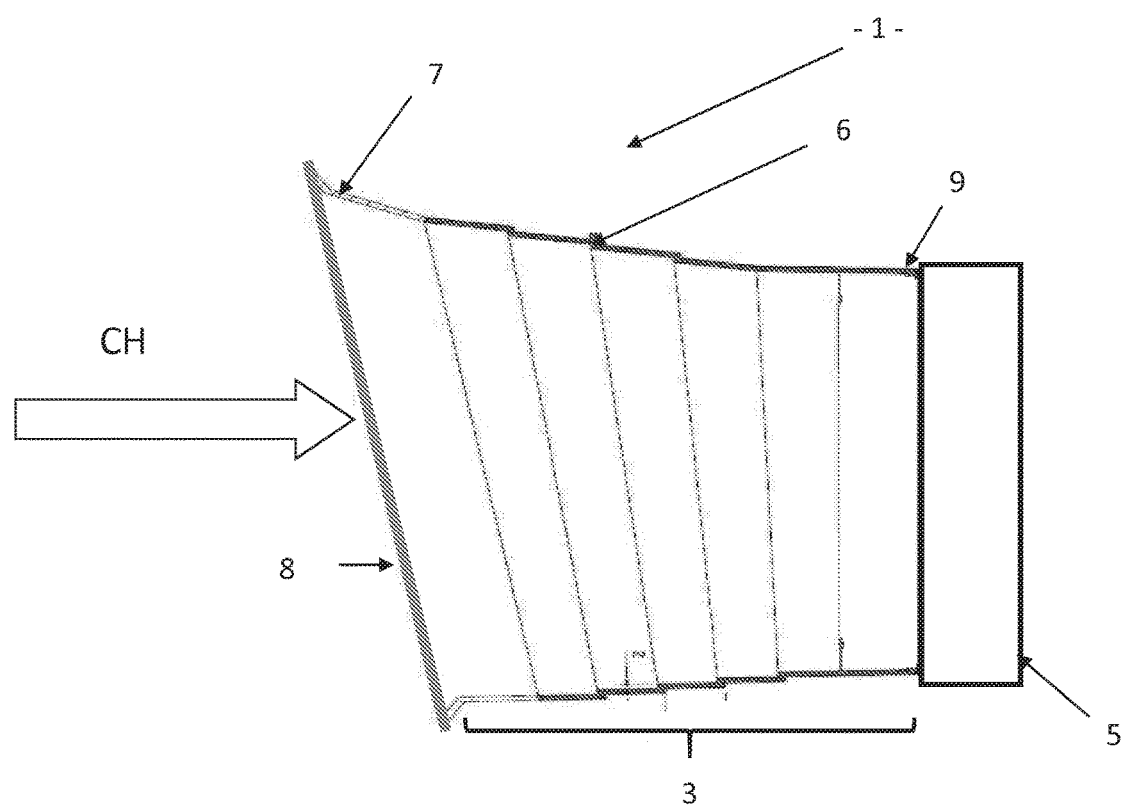
FIG. 3 shows a cross-section along a plane Y of the vehicle (transverse cross-section) of an example of an air guide according to the invention.
Figure 4A:
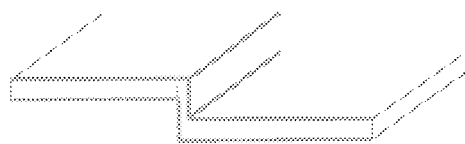
FIG. 4a illustrates in detail two stepped planes connected by a surface forming a mechanical weakness area.
Figure 4B:
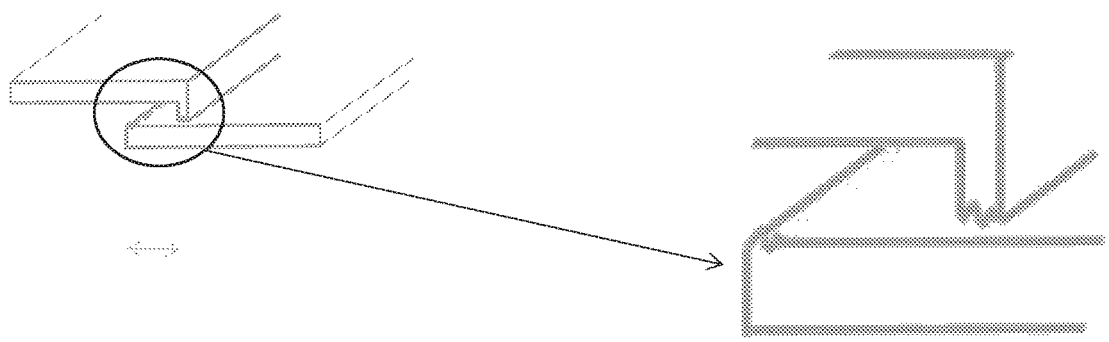

According to one embodiment, each wall of the channel (3) has, along substantially the vehicle longitudinal axis, a stepped cross-section. FIG. 3 shows a cross-section along a plane Y of the vehicle (transverse cross-section). Thus, each wall consists of at least two stepped planes. FIG. 4a illustrates in detail two stepped planes connected by a surface forming a mechanical weakness area. FIG. 4b illustrates in detail the shape change induced by an impact at the location of the detail of FIG. 4a.

During an impact, the step levels must be able to partially retract underneath each other. These relative displacements are possible (facilitated) if each level (step) substantially retains its flat shape in order to slide while being guided under the next one: the material thickness of the levels is therefore chosen, depending on said material, to preserve the rigidity of each level during the impact but also to break between two levels (fragile area) during this impact. While shortening by retraction effect requires at least two levels, it is preferable to plan more levels: for example, for an air guide depth (in X) of 300 mm, and in order to absorb an axial shape change of 150 mm:
with only two levels (and one fragile area), 100% retraction would be required (over 150 mm) between these two levels
with four levels (and three fragile areas), it is sufficient to guarantee "good" retraction over 66% (over 50 mm) between two successive levels Furthermore, under conditions of real impact on road, the impact may not be strictly head-on (i.e. not in Y0, but with a lateral shift relative to position Y0, or along a non-zero angle relative to the X-axis, etc.), and in this case the level guiding conditions during retraction are not the same in all the areas of the air guide.

It is therefore easier to guarantee that shortening will be obtained by four or five levels than by just two.

According to the example of FIG. 1, the channel (3) consists of four walls: two walls parallel to the transverse plane (PT) having a stepped sagittal cross-section, and two walls parallel to the sagittal plane (PS) having a stepped transverse cross-section.

Thus, each wall consists of at least two stepped planes. The steps must in fact preferably be located on all sides of the air guide to avoid blocking the shortening. The two stepped planes are two substantially parallel planes connected by a surface substantially perpendicular to the planes. The surfaces forming intersection between two stepped planes form the mechanical weakness areas (6).

According to one embodiment, the intersections between two planes are formed by a film of minimum thickness. The minimum thickness is the smallest thickness that can be obtained by an injection moulding process, while guaranteeing airtightness at the intersections.

According to one embodiment, the minimum thickness is less than 0.2 mm, and the general thickness of the walls, apart from the mechanical weakness areas (6) is about 2 mm.

Figure 5:
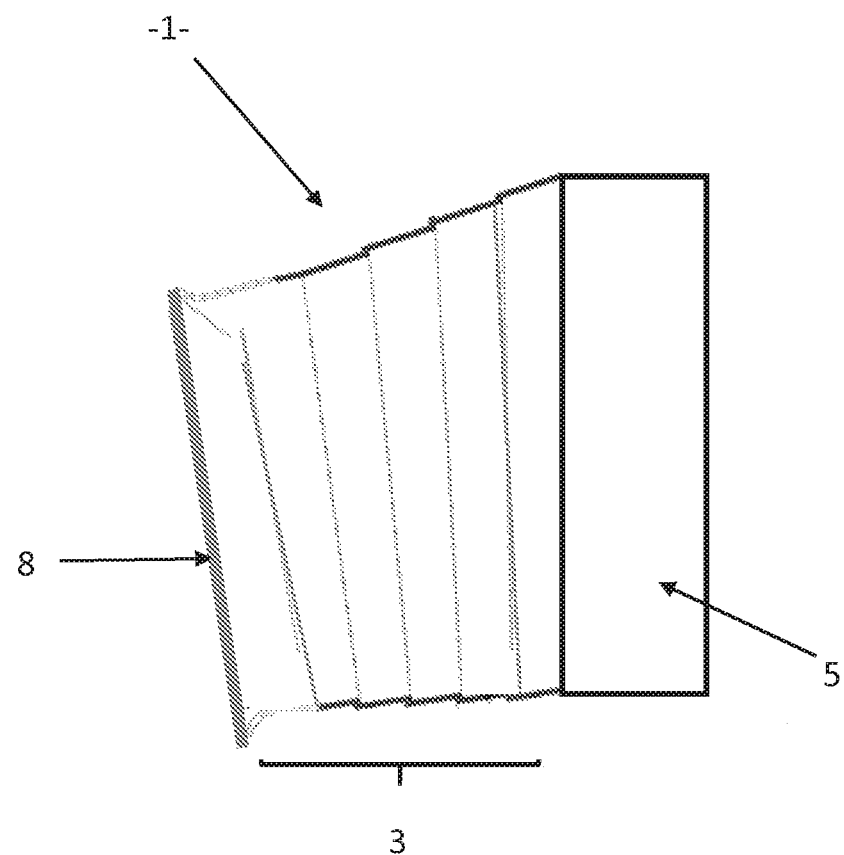
FIG. 5 illustrates a channel comprising, from the front towards the rear of the vehicle, an increasing cross-section unlike the channel of FIG. 3.

According to alternative embodiments, the channel (3) may comprise, from the front to the rear of the vehicle, an increasing (FIG. 5) or decreasing (FIG. 3) cross-section. According to one of these alternatives, the steps forming the mechanical weakness areas (6) are, in a given direction, ascending or descending.

According to alternative embodiments, the air guide (1) can be obtained in a single piece by moulding or it may consist of several parts moulded separately then assembled afterwards (depending, for example, on the conditions as regards accessibility and assembly on the vehicle): the junctions between each part may advantageously comprise shapes improving the airtightness, for example by grooves and ribs overlapping at the part edges.

According to one preferred embodiment, these mechanical weakness areas (6) are located in the parts of the air guide (1) of higher mechanical rigidity. These parts of higher mechanical rigidity are in fact less capable of changing shape in case of impact.

They could therefore transmit excessive forces to the cooling system. These more rigid parts are in particular the junction between the vertical side walls and the horizontal walls generating rigidity by "corner effect" or "box effect", since each wall acts as a stiffening rib for the other wall.

Thus, the mechanical weakness areas (6) are present:
in priority, in the most rigid parts by "corner" or "box" effect;
then in the parts adjacent to these rigid parts;
lastly, optionally but preferably, between these rigid parts.

The number of stepped planes on a wall is defined according to the length of the air guide (1). A sufficient number of shape-changing lines is in fact required so that, during an impact, the air guide shortens enough to protect the cooling system.

The air guide (1) advantageously comprises a skirt or duct (7) made of flexible material adapted to form a seal between the air guide and a bumper (8), when the air guide is mounted onto the vehicle.

The air guide (1) advantageously comprises a means (9) for supporting and securing the air guide (1) on the cooling system (5).

The invention also relates to a motor vehicle front surface comprising at least one air guide (central or intercooler) according to the invention.

The invention also relates to a motor vehicle comprising a front surface according to the invention.

The invention claimed is:

1. An air guide for a front surface of a motor vehicle comprising:
a channel for sealably channeling air entering through a front of the motor vehicle to a cooling system when the air guide is mounted onto the motor vehicle,
wherein the channel includes mechanical weakness areas defining shape-changing areas configured to, along a longitudinal axis of the motor vehicle, shorten the air guide when said mechanical weakness areas change shape;
wherein walls forming the channel include a top wall, a bottom wall and a side wall and have a general thickness, and the mechanical weakness areas have areas that are thinner than the general thickness, said thinner areas forming shape-changing lines;
wherein a number N of shape-changing lines in each wall of the channel, substantially parallel to a front plane, is defined according to a length of the air guide;
wherein each of the top wall, the bottom wall and the side wall includes at least two stepped planes, surfaces forming intersections between the stepped planes forming the mechanical weakness areas; and
wherein the mechanical weakness areas include a different material than a material of the walls.

2. Air guide according to claim 1, wherein each of the mechanical weakness areas form a continuous line in a substantially front section of the channel.

3. Air guide according to claim 2, wherein the channel includes a set of walls forming a rectangle in the front section.

4. Air guide according to claim 1, wherein the intersections between two planes are formed by a film to provide a seal.

5. Air guide according to claim 4, wherein a thickness of the film is less than 0.2 mm, and a general thickness of the walls is about 2 mm.

6. Air guide according to claim 5, wherein the thickness of the film is located in an area of the air guide including corners of the air guide.

7. Air guide according to claim 1, comprising a skirt made of flexible material adapted to form a seal between the air guide and a bumper when the air guide is mounted onto the motor vehicle.

8. Front surface of a motor vehicle comprising at least one air guide according to claim 1.

9. A motor vehicle comprising the front surface according to claim 8.

* * * * *

UNITED STATES PATENT AND TRADEMARK OFFICE
CERTIFICATE OF CORRECTION

PATENT NO. : 10,226,994 B2
APPLICATION NO. : 15/329621
DATED : March 12, 2019
INVENTOR(S) : Thierry Roussel and Arnold Fayt It is certified that error appears in the above-identified patent and that said Letters Patent is hereby corrected as shown below:

On the Title Page

(73) Assignee should read as: Compagnie Plastic Omnium, Lyon (FR)

Signed and Sealed this
Eighteenth Day of June, 2019

Andrei Iancu
*Director of the United States Patent and Trademark Office*